July 6, 1954

G. O. FREDRICKSON 2,683,250

METHOD AND APPARATUS FOR MACHINABILITY TESTING

Filed July 17, 1947

INVENTOR;
GUSTAV O. FREDRICKSON
BY Romeyn A. Spare
HIS ATTORNEY.

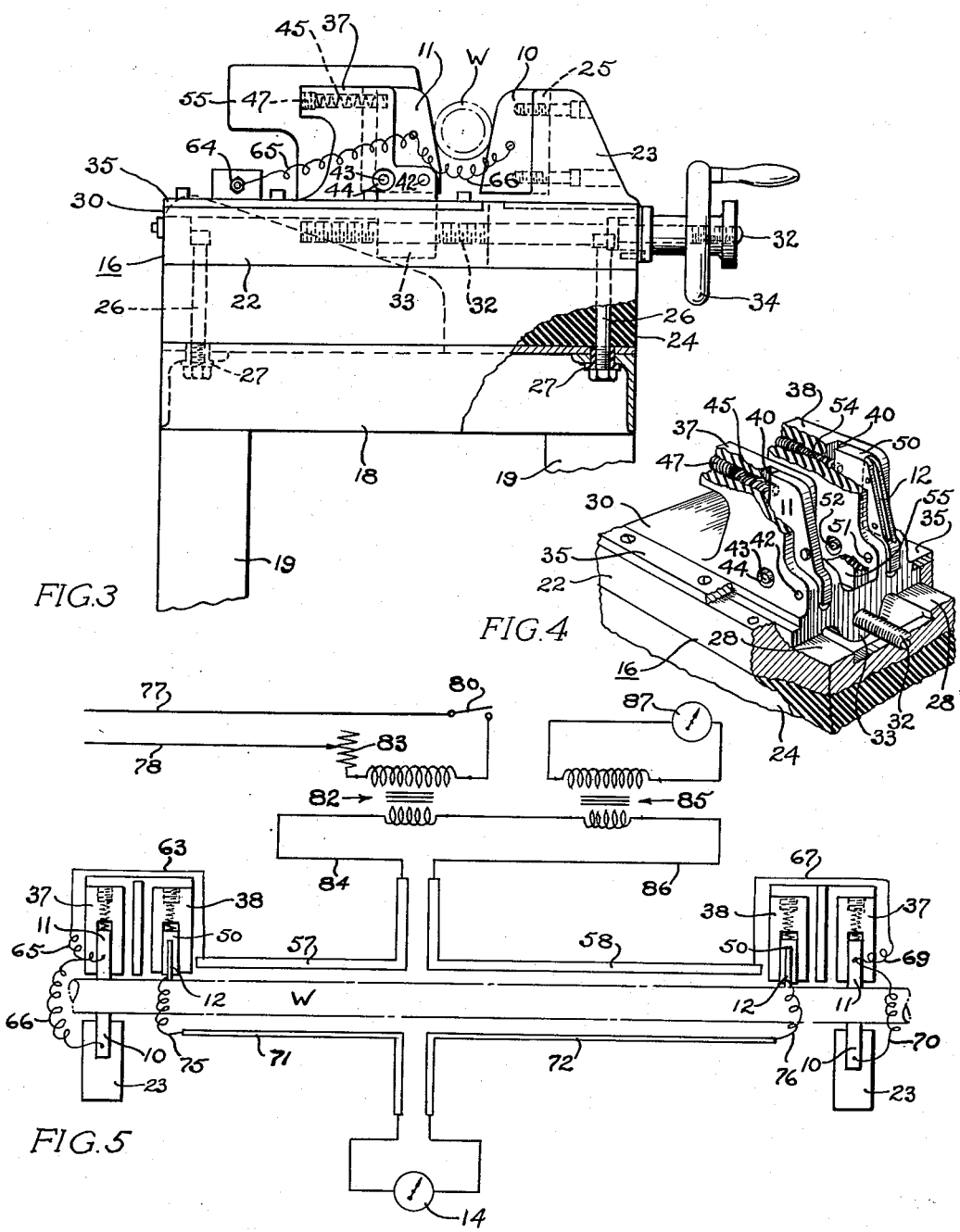

Patented July 6, 1954

2,683,250

UNITED STATES PATENT OFFICE 2,683,250

METHOD AND APPARATUS FOR MACHINABILITY TESTING

Gustav O. Fredrickson, Forestville, Conn., assignor to General Motors Corporation, Detroit, Mich., a corporation of Delaware Application July 17, 1947, Serial No. 761,583

4 Claims. (Cl. 324—64)

This invention relates to machinability testing and particularly to a method and apparatus for testing the machining characteristics of elongated steel members.

Minor variations in the heat treatment of steel members such as bars and tubes which have the same composition often produce considerable differences in the machinability of these members. Also, the extent of cold drawing, cold rolling and/or other cold working operations upon these steel bars or tubes subsequent to their heat treatment, materially affects their machining characteristics. Frequently, one of these steel bars or tubes which has been subjected to improper heat treatment and/or improper cold working, offers so much resistance to machining that it has to be discarded.

Dependent upon its heat treatment, steel may have a well spherodized grain structure which constitutes minute spaced globules of cementite substantially uniformly distributed throughout a continuous body of ferrite, or the same steel may have a pearlitic grain structure consisting of alternate angularly disposed laminae of cementite and ferrite. In many compositions of steel, and particularly in the steel used for antifriction bearings, a well spherodized grain structure tends towards good machining properties, and a pearlitic structure has poor machining properties since the laminae of cementite and ferrite obstruct the smooth passage of a cutting tool. Cold working operations on steel, such as cold drawing or cold rolling operations, tend to produce a more uniform grain structure and a better alignment of molecules which provides improved machining characteristics.

In the manufacture of antifriction bearings, it is common practice to simultaneously machine several similar bars or tubes in a multiple spindle machine. However, to effect satisfactory machining operations, each group of bars or tubes to be machined at the same time and in the same machine must have closely similar machining characteristics. Heretofore, it has been considered impracticable to sort steel bars or steel tubes from a stock pile in accordance with their machinability since much time and expense is required to cut a test sample from each piece of stock, grind and polish flat surfaces on these samples, etch these surfaces and thereafter photomicrograph these etched surfaces to determine their grain structures. Furthermore, a photomicrograph of a well spherodized structure does not usually indicate any difference in the amount of cold working even though this cold working has been improper to the extent that the steel is not provided with satisfactory machining characteristics.

Hence, much production time has been lost due to excessive handling and discarding of stock since the steel bars or tubes in a stock pile could neither be practicably nor accurately sorted in accordance with their machining characteristics prior to a machining operation.

It is, therefore, an object of this invention to provide an improved method and apparatus for rapidly and accurately determining the machinability of steel members.

A further object is to provide a method and apparatus for quickly and accurately determining if a steel member has been subjected to the required heat treatment and to the required cold working operations for producing the required characteristics of machinability.

Another object is to provide an electrical method and apparatus for rapidly and easily testing the machining characteristics of selected portions of steel bars and tubes.

To these ends and also to improve generally upon devices of this character, the invention consists in the various matters hereinafter described and claimed. In its broader aspects, the invention is not necessarily limited to the specific construction illustrated in the accompanying drawings in which Figure 1 is a plan view of the testing apparatus;

Figure 3 is an enlarged fragmentary end view;

Figure 4 is a fragmentary perspective view of one of the slide members and its mounting; and Figure 5 is a schematic wiring diagram.

Figure 1:
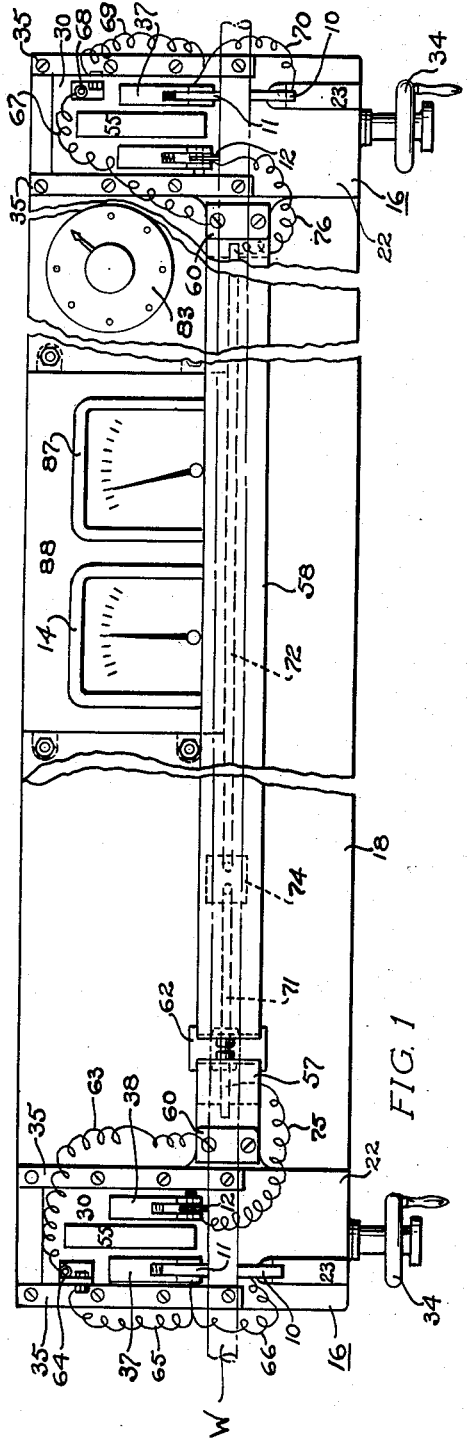
Figure 2:
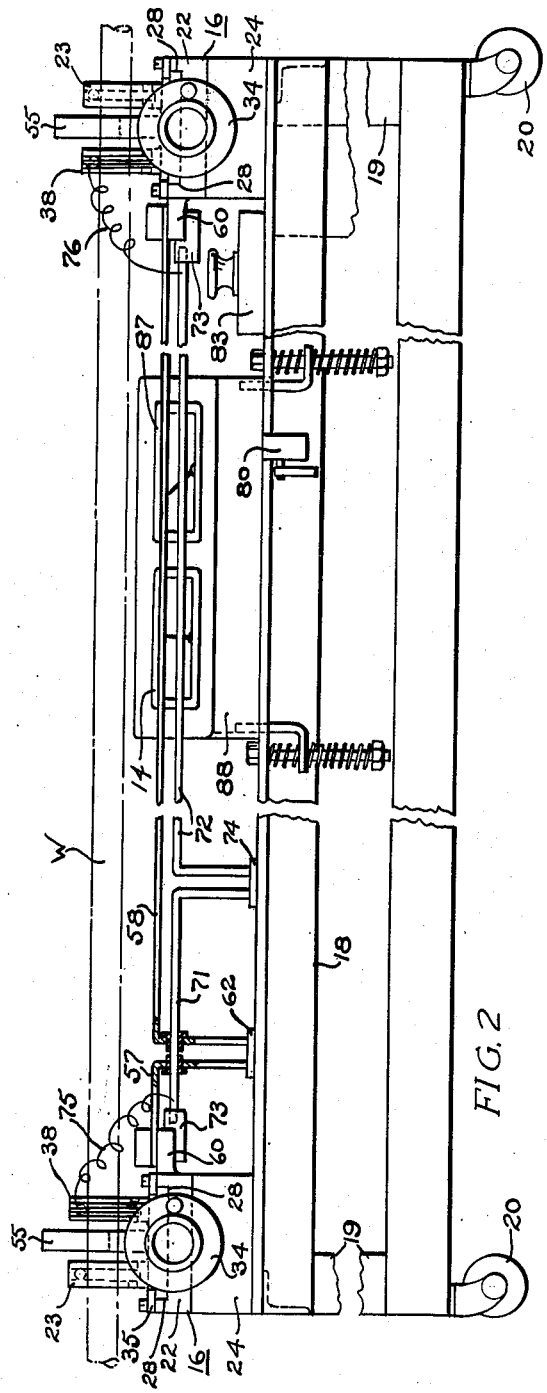
Figure 2 is a side elevation.

In my method for measuring the machinability of an elongated steel work piece, as a bar or tube W having a substantially uniform cross section, an alternating current of fixed amperage and fixed voltage is fed from two spaced sets of work-gripping contactors 10, 11 through a predetermined length of the work piece W, and the reactance to this current flow along a predetermined intermediate length of the work piece between a pair of spaced work-engaging contactors 12 is measured by a meter 14. I have found that changes in the structure of a steel work piece from a well spherodized structure to a pearlitic structure, and also changes in the alignment of molecules in such a work piece affects the reactance to flow of alternating current through this work piece. Hence, when a predetermined alternating current is fed between the sets of contactors 10, 11 and through a predetermined length of an elongated steel work piece W of known composition, the reactance measured by the meter 14 has a definite relation to and indicates the machinability of this work piece being tested. This measurement may be compared with similar measurements made on similar work pieces of known machining characteristics, or, if desired, the meter 14 may be calibrated in units of machinability.

In the illustrated embodiment, a pair of spaced similar work holders 16 are respectively mounted on each end of a support, herein shown as an elongated table 18 having legs 19 suitably mounted on castors 20. The following description of one of these work holders applies to both, and corresponding parts of both work holders are similarly identified. An electrically conductive base 22, preferably composed of brass or bronze and having an upwardly extending jaw 23 fixed to its forward end, is mounted on a block 24 of insulation. The work-engaging contactor 10, which may be of a suitable hardened electroconductive material as a beryllium bronze or copper alloy, is demountably secured within and projects transversely of the table from a shallow vertically extending groove 25 in the jaw 23. Bolts 26 detachably secure the base 22 and its supporting block 24 to the end of the table top, these bolts being electrically insulated from the table by flanged insulating sleeves 27 that extend through bores in the table top.

Spaced ways 28 on the base 22 support a slide member 30 for slidable movement transversely of the table towards and from the jaw 23 under control of a feed screw 32 threaded in a depending portion 33 of the slide member 30 and rotated by a handwheel 34. The feed screw 32 is journalled in the base beneath the jaw 23 and secured against axial movement relative to this base. Cover plates 35, secured to the base as by screws, maintain the slide member on its ways 28 and in electrical contact with the base 22. The forward end of the slide member 30 has a pair of generally parallel upwardly extending jaws 37 and 38, the jaw 37 being located substantially opposite the fixed jaw 23, and the jaw 38 being laterally spaced from the jaw 37 towards the work holder 16 at the other end of the table 18. The front of each of these jaws 37, 38 has an open topped vertically extending groove 40 which opens forwardly and extends at its lower end into a forwardly directed lower jaw projection. The work-engaging contactor 11 which may be of the same material as that of the contactor 10, is pivotally mounted at its lower forward portion by a pin 42 secured in the forward jaw projection, the rearward portion of this contactor being slidably received within the groove 40. A pin 43, secured within the lower rearward portion of the contactor 11, extends transversely into an enlarged bore 44 in the jaw 37 to limit the extent of pivotal movement of this contactor. A coiled spring 45, in a bore through the jaw 37, is compressed between an adjustable screw 47, threaded into one end of this bore, and the contactor 11 to resiliently urge this contactor towards a work-engaging position. The opposed work-engaging faces of each pair of contactors 10 and 11 slope downwardly towards each other to provide a tapering work supporting throat which facilitates mounting a work piece in and demounting it from a testing position.

The contactor 12 which may be of the same material as that of the contactor 10, has a downwardly sloping work-engaging face generally corresponding to the work-engaging face of the adjacent contactor 11, and this contactor 12 has its rearward portion mounted as by rivets in a forwardly open vertical slot in an insulator block 50 composed of fiber or other suitable material which will electrically insulate the contactor 12 from the slide member 30 and from the other contactors. The insulator block 50 is pivotally mounted for movement in the slot 49 of the jaw 38 in the same manner as described for the contactor 11. A pin 51, extending through the jaw 38 and through the forward lower portion of this insulator block 50 pivotally supports this block, the extent of pivotal movement being limited by a pin 52 which extends into an enlarged bore in the jaw 38. A coiled spring 54 urges the block 50 and contactor 12 towards the work piece. After placing a work piece in the throat formed by the contactors, the handwheels 34 may be tightened to assure electrical contact of all the contactors 10, 11, 12 with the work piece. A partition 55 of insulating material, as fiber, is mounted between and projects above the tops of each pair of adjacent jaws 37, 38 to prevent accidental short circuit between the adjacent contactors 11 and 12.

A pair of rigid conductors, as bus bars 57 and 58, extend beneath and generally parallel to a work piece W mounted in testing position. These bus bars are rigidly secured in position, the outer bar ends being respectively fastened to laterally extending projections 60 on the base 22, and their inner ends, which project downwardly in spaced relation through the table top, being supported and electrically insulated from the table by an insulator block 62. The outer end of the bus bar 57 is connected by an insulated wire 63 to a terminal 64 on one of the slide members 30 and thence by flexible insulated wires 65 and 66 to the adjacent work-engaging contactors 10 and 11. The outer end of the bus bar 58 is similarly connected through an insulated wire 67, a terminal 68 and insulated wires 69 and 70 to the other pair of opposed contactors 10 and 11. A second pair of conductors, as bus bars 71 and 72, are rigidly fastened in generally parallel spaced relation to and preferably beneath the bus bars 57 and 58. The outer ends of these bus bars 71 and 72 are respectively secured to insulating blocks 73, and their inner ends which project downwardly in spaced relation through the table top are supported by an insulator 74. Insulated wires 75 and 76 respectively connect the outer ends of these bus bars 71 and 72 to the contactors 12.

Alternating current from a suitable constant voltage source is fed through lines 77 and 78, one of these lines, as 77, being connected through a manually operable switch 80 to the primary of a transformer 82, and the other line being connected through a voltage regulator 83 to this transformer primary. The secondary of the transformer 82 is connected through a wire 84 to the inner end of the bus bar 57 and is also series-connected through the primary of a current transformer 85 and a wire 86 to the inner end of the bus bar 58. An ammeter 87 is connected to the secondary of the transformer 85 to aid in adjusting the voltage regulator 83 for producing a predetermined constant current through the work piece. The meter 14 is connected by wires to the inner ends of the bus bars 72 and 73. The meters 14 and 87 are mounted in a housing 88 which is resiliently supported on the table through springs to avoid meter damage.

In operation, a work piece W is placed in testing position and the handwheels 34 are tightened to assure electrical contact of all the contactors 10, 11 and 12 with the work piece. The switch 80 is closed, and the voltage regulator 83 is adjusted to produce a predetermined reading on the meter 87. The reactance to alternating current flow in the work piece W is measured by the meter 14 to indicate the machining characteristics of the work piece. This meter 14 is preferably calibrated in units of machinability so that the operator may directly determine the machining characteristics of the work piece. The bus bars 57, 58 and 71, 72 are rigidly mounted in position relative to the work piece to avoid erroneous reading on the meter 14 which might result from changes in inductive and capacitative effects between these bus bars and the work piece. The switch 80 is opened. The handwheels 34 are loosened, and the work piece is removed. The apparatus is now ready for another machinability test.

I claim:

1. The method of determining the machinability of a steel work piece of known composition comprising the steps of feeding an alternating current at a controllable amperage and at a predetermined voltage between two predetermined positions on the work piece, and measuring the reactance to said current flow between two predetermined intermediate positions on said work piece.

2. In an apparatus for determining the machinability of an elongated steel work piece, a table, a support mounted on each end of and electrically insulated from the table, a pair of opposed contactors on each support, a third contactor on each support and insulated from said other contactors, means to relatively move said contactors into and out of work gripping positions, a pair of generally aligned bus bars rigidly supported in spaced adjacent relation to said work piece, means electrically connecting the outer ends of the bus bars respectively to the pairs of opposed contactors, means connecting the inner ends of the bus bars in circuit with an alternating current at a predetermined amperage, and a meter connected to said third contactors for measuring the reactance to the flow of alternating current in said work piece.

3. In an apparatus for determining the machinability of an elongated steel work piece, a table, a support mounted on each end of and electrically insulated from the table, a pair of opposed contactors on each support, said contactors having opposed sloping faces for cooperatively engaging and supporting the work piece, a third contactor on each support and insulated from said other contactors, means to relatively move said contactors into and out of yieldable work supporting positions, a pair of spaced bus bars extending longitudinally of and spaced from the work piece, means electrically connecting the outer ends of the bus bars respectively to the pairs of opposed contactors, means connecting the inner ends of the bus bars in circuit with an alternating current at a controllable amperage, and a meter responsive to the reactance of the flow of alternating current through the work piece between said third contactor.

4. In an apparatus for determining the machinability of an elongated steel work piece, a table, a support mounted on each end of and electrically insulated from the table, a pair of opposed contactors on each support, said contactors having downwardly sloping faces for cooperatively supporting the work piece, a third contactor on each support and insulated from said other contactors, resilient mounting means for two of the contactors on each support, means to relatively move the contactors into and out of yieldable work piece supporting engagement, a pair of spaced bus bars extending longitudinally of and spaced from the work piece, connections electrically connecting the outer bus bar ends respectively to the pairs of opposed contactors, a transformer connected across the inner bus bar ends, means to supply an alternating current at a predetermined voltage to the transformer, a second pair of bus bars spaced adjacent to the other bus bars and electrically connected at their outer ends respectively to said third contactors, and a meter connected across the inner ends of the second pair of bus bars and responsive to the reactance to current flow in the work piece.

References Cited in the file of this patent

UNITED STATES PATENTS

| Number | Name | Date |
|---|---|---|
| 1,829,793 | Enlund | Nov. 3, 1931 |
| 1,895,643 | Putnam | Jan. 31, 1933 |
| 2,133,725 | Sperry et al. | Oct. 18, 1938 |
| 2,142,619 | Sciaky | Jan. 3, 1939 |
| 2,277,431 | Fitch | Mar. 24, 1942 |
| 2,351,201 | Gillis | June 13, 1944 |
| 2,368,119 | De Lanty et al. | Jan. 30, 1945 |